United States Patent
Angel et al.

(10) Patent No.: US 11,538,236 B2
(45) Date of Patent: Dec. 27, 2022

(54) DETECTING BACKDOOR ATTACKS USING EXCLUSIONARY RECLASSIFICATION

(71) Applicant: International Business Machines Corporation, Armonk, NY (US)

(72) Inventors: Nathalie Baracaldo Angel, San Jose, CA (US); Bryant Chen, San Jose, CA (US); Heiko H. Ludwig, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 648 days.

(21) Appl. No.: 16/571,318

(22) Filed: Sep. 16, 2019

(65) Prior Publication Data
US 2021/0081718 A1 Mar. 18, 2021

(51) Int. Cl.
| G06V 10/774 | (2022.01) |
| G06K 9/62 | (2022.01) |
| G06N 3/04 | (2006.01) |
| G06N 3/08 | (2006.01) |
| G06V 10/764 | (2022.01) |
| G06V 10/762 | (2022.01) |

(52) U.S. Cl.
CPC ....... *G06V 10/7753* (2022.01); *G06K 9/6218* (2013.01); *G06K 9/6259* (2013.01); *G06K 9/6267* (2013.01); *G06N 3/04* (2013.01); *G06N 3/08* (2013.01); *G06V 10/762* (2022.01); *G06V 10/764* (2022.01)

(58) Field of Classification Search
CPC . G06N 3/04; G06N 3/08; G06N 20/00; H04L 63/1433; H04L 63/1441; H04L 29/06918; G06K 9/6267; G06V 10/762; G06V 10/7753
See application file for complete search history.

(56) References Cited

U.S. PATENT DOCUMENTS

| 8,762,298 | B1 | 6/2014 | Ranjan et al. |
| 9,397,921 | B2 | 7/2016 | Urmanov et al. |
| 9,762,611 | B2 | 9/2017 | Wallace et al. |
| 11,188,789 | B2 | 11/2021 | Chen et al. |

(Continued)

OTHER PUBLICATIONS

Chen, B., et al., "Detecting Backdoor Attacks on Deep Neural Networks by Activation Clustering", arXiv:1811.03728v1, Nov. 9, 2018.

(Continued)

*Primary Examiner* — Daniel G Mariam
(74) *Attorney, Agent, or Firm* — Lieberman & Brandsdorfer, LLC

(57) ABSTRACT

Embodiments relate to a system, program product, and method for processing an untrusted data set to automatically determine which data points there are poisonous. A neural network is trained network using potentially poisoned training data. Each of the training data points is classified using the network to retain the activations of at least one hidden layer, and segment those activations by the label of corresponding training data. Clustering is applied to the retained activations of each segment, and a clustering assessment is conducted to remove an identified cluster from the data set, form a new training set, and train a second neural model with the new training set. The removed cluster and corresponding data are applied to the trained second neural model to analyze and classify data in the removed cluster as either legitimate or poisonous.

20 Claims, 8 Drawing Sheets

(56) References Cited

U.S. PATENT DOCUMENTS

| | | |
|---|---|---|
| 2014/0324429 A1 | 10/2014 | Weilhammer |
| 2017/0230360 A1 | 8/2017 | Mosenia |
| 2017/0244746 A1 | 8/2017 | Hawthorn |
| 2018/0336916 A1 | 11/2018 | Baracaldo et al. |
| 2018/0349605 A1 | 12/2018 | Wiebe et al. |
| 2018/0365139 A1 | 12/2018 | Rajpal et al. |
| 2020/0003818 A1 | 1/2020 | House |
| 2020/0019821 A1 | 1/2020 | Baracaldo-Angel |
| 2020/0050945 A1 | 2/2020 | Chen |
| 2020/0234515 A1 | 7/2020 | Gronsbell |
| 2021/0182611 A1 | 6/2021 | Li |
| 2022/0121742 A1 | 4/2022 | Strogov |

OTHER PUBLICATIONS

Wang, B., et al., "Neural Cleanse: Identifying and Mitigating Backdoor Attacks in Neural Networks", 40th IEEE Symposium on Security and Privacy, May 20-22, 2019.

Cao, Y., et al., "Efficient Repair of Polluted Machine Learning Systems via Casual Unlearning", Proceedings of the 2018 on Asia Conference on Computer and Communications Security, Jun. 2018.

Cao, Y., et al., "Towards Making Systems Forget with Machine Unlearning", 2015 IEEE Symposium on Security and Privacy, IEEE Computer Society, 2015.

Wang, G., et al., "Man vs. Machine: Practical Adversarial Detection of Malicious Crowdsourcing Workers", Proceedings of the 23 USENIX Security Symposion, Aug. 20-22, 2014.

Liu, K., et al., "Fine-Pruning: Defending Against Backdoor Attacks on Deep Neural Networks", arXiv:1805.12185v1, May 30, 2018.

Gu, T., et al., "BadNets: Identifying Vulnerabilities in Machine Learning Model Supply Chain", arXiv:1708.06733, Aug. 2017.

Baracaldo, N., et al., "Mitigating Poisoning Attacks on Machine Learning Models: A Data Provenance Based Approach," Proceedings of the 10th ACM Workshop on Artificial Intelligence and Security, Nov. 3, 2017.

Laishram, R., et al., "Curie: A method for protecting SVM Classifier from Poisoning Attack", arXiv:1606.01584v2, Jun. 7, 2016.

Al-Zoubi, M., et al., "New Outlier detection Method Based on Fuzzy Clustering", WSEAS Transactions on Information Science and Applications, Issue 5, vol. 7, May 2010.

Zhang, Ji, "Detecting Outlying Subspaces for High-Dimensional Data: A Heuristic Search Approach", Proceedings of the 2005 SIAM International Workshop on Feature Selection for Data Mining: Interfacing Machine Learning and Statistics, 2005.

Khurana, N., et al., "Preventing Poisoning Attacks on AI Based Threat Intelligence Systems" arXiv:1807.07418v1, Jun. 19, 2018.

Yang, C., et al., "Generative Poisoning Attack Method Against Neural Networks", arXiv:1703.01340v1, Mar. 3, 2017.

Molloy, I., et al., "Adversarial Machine Learning", Sep. 14, 2018.

Bhargava, Bharat, Cybersecurity Research Consortium, NGCRC Project Proposal for Secure Intelligence Autonomous Systems with Cyber Attribution, Oct. 6, 2018.

Anonymous, Using Deep Learning on Rule-Based Malicious Traffic Detectors to Generate New Malicious-Like Traffic for Layer 4-7 Testing, ip.com, Dec. 26, 2018.

Grill, Martin, "Detecting Malicious Network Behavior Using Only TCP Flag Information", ip.com, Aug. 6, 2014.

Anonymous, "Systems and Method for Preventing Automated Attacks", ip.com, May 1, 2014.

List of IBM Patents or Applications Treated as Related, Sep. 2019.

Office Action, U.S. Appl. No. 16/571,321, dated May 18, 2022.

Office Action, U.S. Appl. No. 16/571,323, dated Jun. 21, 2022.

DETECTING BACKDOOR ATTACKS USING EXCLUSIONARY RECLASSIFICATION

BACKGROUND

The present embodiments relate to an artificial intelligence platform and an optimization methodology to detect backdoor attacks thereon. More specifically, the embodiments relate to an optimized methodology for detecting and removing backdoors in a neural network that may be used to insert poisonous training data therein.

SUMMARY

The embodiments include a system, computer program product, and method for cross-compliance risk assessment and optimization.

In one aspect, a computer system is provided to support an artificial intelligence (AI) platform. As shown, a processor is operatively coupled to the memory and is in communication with the AI platform. The AI platform is provided with tools, including, but not limited to, a training manager, a machine learning (ML) manager, a cluster manager, and a classification manager. The training manager functions to train one or more neural models with an untrusted data set. The ML manager functions to classify each data point in the untrusted data set using a trained first neural model, and to retain activations of one or more designated layers in the trained neural model. The cluster manager functions to apply a clustering technique on the retained activations for each label, and for each cluster to assess integrity of data in the cluster. The cluster manager further removes an identified cluster from the data set, and forms a new training set with data remaining in the data set. In addition, the cluster manager trains a second neural model using the new training set and, using the trained second neural model, analyzes data in the removed cluster and assesses alignment of the classified data with respect to a label assignment. The classification manager functions to assign a classification to the assessed cluster, where the cluster classification corresponds to the alignment assessment. The cluster classification is one of poisonous and legitimate.

In another aspect, a computer program product is provided to utilize machine learning to process an untrusted training data set. The computer program product includes a computer readable storage medium with embodied program code that is executable by a processing unit. Program code is provided to train a first neural model with the untrusted data set and classify each data point in the untrusted data set using the trained first neural model. The program code retains activations of one or more designated layers in the trained first neural model and applies a clustering technique on the retained activations for each label. For each cluster, the program code assesses the integrity of the data in the cluster, including identification and removal of a cluster from the data set, and formation of a new training set with data remaining in the data set. The program code trains a second neural model using the new training set, and using the trained second neural model, analyzes the data in the removed cluster and assesses alignment of the classified data with respect to a label assignment. Upon completion of the alignment assessment, a classification of either poisonous or legitimate is assigned to the assessed cluster.

In yet another aspect, a method is provided to utilize machine learning to process an untrusted training data set. A neural network receives the untrusted training data set, where each data point of the untrusted data set has a label. A first neural model is trained using the untrusted data set. Each data point in the untrusted data set is classified using the trained first neural model, and activations of one or more designated layers in the trained first neural model are retained. A clustering technique is applied on the retained activations for each label, and an integrity assessment is conducted for each cluster. An identified cluster is removed from the data set, and a new training set is formed with data remaining in the data set. A second neural model is trained using the new training set. Using the trained second neural model, data in the removed cluster is analyzed and alignment of the classified data with respect to a label assignment is assessed. A classification is assigned to the assessed cluster, where the cluster classification corresponds to the alignment assessment. Upon completion of the alignment assessment, a classification of either poisonous or legitimate is assigned to the assessed cluster.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments, and not of all embodiments, unless otherwise explicitly indicated.

DETAILED DESCRIPTION

Figure 1:
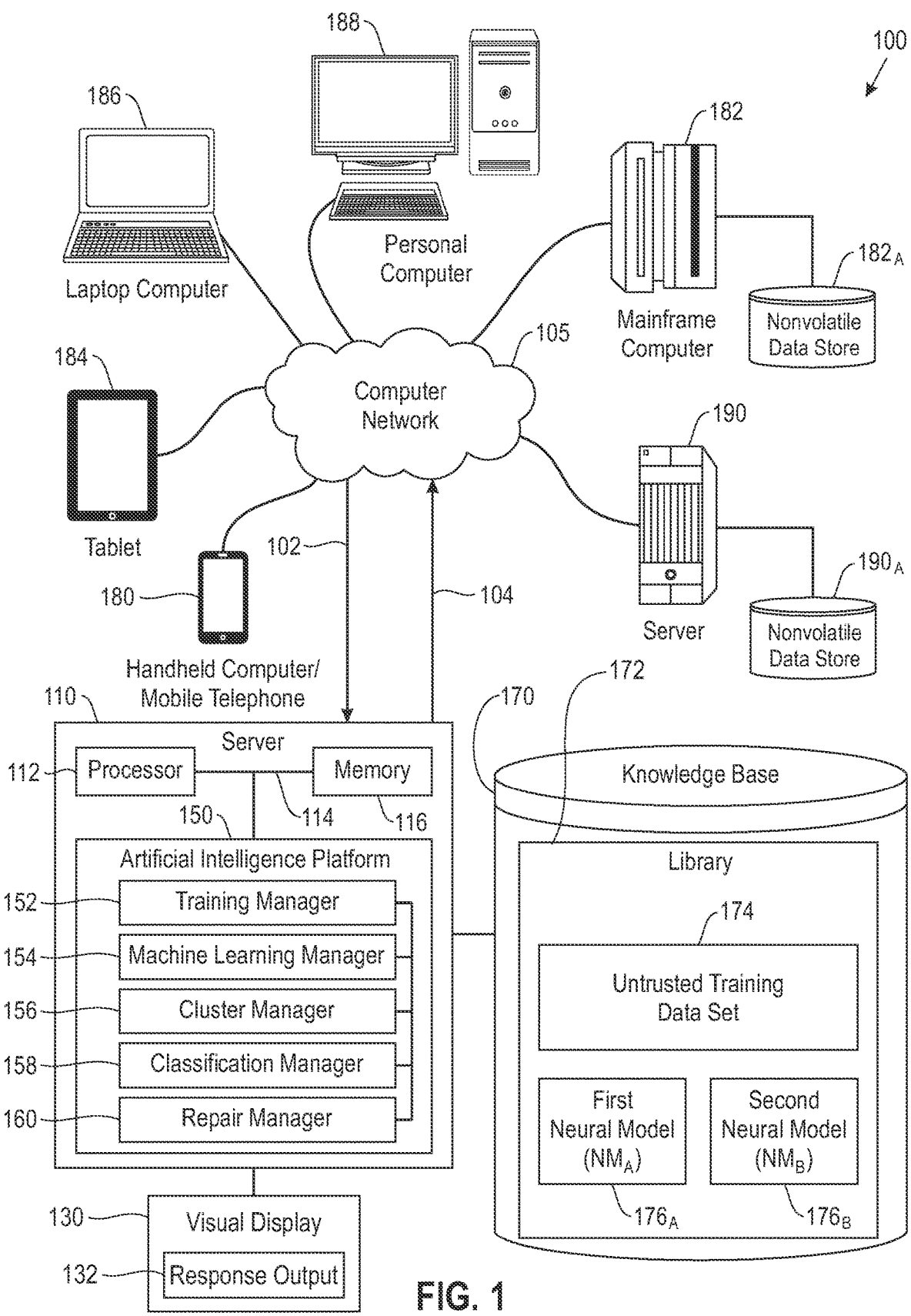
FIG. 1 depicts a system diagram illustrating an artificial intelligence platform computing system.

It will be readily understood that the components of the present embodiments, as generally described and illustrated in the Figures herein, may be arranged and designed in a wide variety of different configurations. Thus, the following detailed description of the embodiments of the apparatus, system, method, and computer program product of the present embodiments, as presented in the Figures, is not intended to limit the scope of the embodiments, as claimed, but is merely representative of selected embodiments.

Reference throughout this specification to "a select embodiment," "one embodiment," or "an embodiment" means that a particular feature, structure, or characteristic described in connection with the embodiment is included in at least one embodiment. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

Artificial Intelligence (AI) relates to the field of computer science directed at computers and computer behavior as related to humans. AI refers to the intelligence when machines, based on information, are able to make decisions, which maximizes the chance of success in a given topic. More specifically, AI is able to learn from a data set to solve problems and provide relevant recommendations. For example, in the field of artificial intelligent computer systems, natural language systems (such as the IBM Watson® artificially intelligent computer system or other natural language interrogatory answering systems) process natural language based on system acquired knowledge. To process natural language, the system may be trained with data derived from a database or corpus of knowledge, but the resulting outcome can be incorrect or inaccurate for a variety of reasons.

Machine learning (ML), which is a subset of AI, utilizes algorithms to learn from data and create foresights based on this data. More specifically, ML is the application of AI through creation of models, for example, neural networks that can demonstrate learning behavior by performing tasks that are not explicitly programmed. Deep learning is a type of ML in which systems can accomplish complex tasks by using multiple layers of neurons that activate based on an output or outputs of a previous layer of neurons, creating increasingly smarter and more abstract activations.

At the core of AI and associated reasoning lies the concept of similarity. Structures, including static structures and dynamic structures, dictate a determined output or action for a given determinate input. More specifically, the determined output or action is based on an express or inherent relationship within the structure. This arrangement may be satisfactory for select circumstances and conditions. However, it is understood that dynamic structures are inherently subject to change, and the output or action may be subject to change accordingly. Existing solutions for efficiently identifying objects and understanding natural language and processing content response to the identification and understanding as well as changes to the structures are extremely difficult at a practical level.

Deep learning is a method of machine learning that incorporates neurons in successive layers to learn from data in an iterative manner. Neural networks are models of the way the nervous system operates. Basic units are referred to as neurons, which are typically organized into layers. The neural network works by simulating a large number of interconnected processing units that resemble abstract versions of neurons. There are typically three parts in a neural network, including an input layer, with units representing input fields, one or more hidden layers, and an output layer, with a unit or units representing target field(s). The units are connected with varying connection strengths or weights. Input data are presented to the first layer, and values are propagated from each neuron to some neurons in the next layer. At a basic level, each layer of the neural network includes one or more operators or functions operatively coupled to output and input. The outputs of evaluating the activation functions of each neuron with provided inputs are referred to herein as activations. Deep learning complex neural networks are designed to emulate how the human brain works, so computers can be trained to support poorly defined abstractions and problems where training data is available. Neural networks and deep learning are often used in image recognition, speech, and computer vision applications.

AI, especially deep learning, has made significant progress in a lot of areas, such as autonomous driving, machine translation, and speech recognition, with profound impact on our society. However, neural models that are training on data from untrustworthy sources provide adversaries with an opportunity to manipulate the model by inserting carefully crafted samples into the training set. An untrusted training data set includes some combination of legitimate data and poisonous data. As used herein, legitimate data includes data resident within the training data set that has not been subject to tampering. Also, as used herein, poisonous data is data resident within the training data set that has been tampered with through at least the mechanisms as described herein. In one embodiment, poisonous data may be inserted into the untrusted training set through a backdoor with a backdoor trigger embedded within the poisonous data. As used herein, the backdoor is an undocumented method of gaining access to a neural model through gaining unauthorized access to the training data set. The backdoor, if present, allows an adversary to bypass an authentication mechanism and introduce false data, e.g. poisonous data, into at least a portion of the data within the training data set. As used herein, an adversary is at least one entity with an intent to corrupt a neural model through alteration of model behavior by manipulating the data that is used to train the model, i.e., the training data set, thereby effecting a source-target misclassification attack, sometimes referred to as a targeted attack, and hereon referred to as a poisoning attack.

An adversary may choose a particular mechanism for the intended victim of the planned attack based on having access to the training data. More specifically, the adversary may affect a poisoning attack on a neural model through gaining access to the training data set that will be used to train the model, thereby corrupting the model in a manner that may be undetected.

Referring to FIG. 1, a schematic diagram of an artificial intelligence platform computing system (100) is depicted. As shown, a server (110) is provided in communication with a plurality of computing devices (180), (182), (184), (186), (188), and (190) across a network connection (105). The server (110) is configured with a processing unit (112) in communication with memory (116) across a bus (114). The server (110) is shown with an artificial intelligence (AI) platform (150) for cognitive computing, including natural language processing and machine learning, over the network (105) from one or more of the computing devices (180), (182), (184), (186), (188), and (190). More specifically, the computing devices (180), (182), (184), (186), (188), and (190) communicate with each other and with other devices or components via one or more wired and/or wireless data communication links, where each communication link may comprise one or more of wires, routers, switches, transmitters, receivers, or the like. In this networked arrangement, the server (110) and the computer network (105) enable communication detection, recognition, and resolution. The server (110) is in operative communication with the computer network through communications links (102) and (104). Links (102) and (104) may be wired or wireless. Other embodiments of the server (110) may be used with components, systems, sub-systems, and/or devices other than those that are depicted herein.

The AI platform (150) is shown herein configured with tools to enable supervised learning. The tools function to implement an optimized methodology using machine learning techniques for detecting and removing backdoors into a neural network that may be used to insert poisonous training data therein using machine learning techniques. The tools include, but are not limited to, a training manager (152), a machine learning (ML) manager (154), a cluster manager (156), a classification manager (158), and a repair manager (160). The AI platform (150) may receive input from the network (105) and leverage a data source (170), also referred to herein as a corpus or knowledge base, to selectively access training and other data. As shown the data source (170) is configured with a library (172) with one or more data sets and corresponding neural models that are created and managed by the ML manager (154). Details of how the training data and the models are created and used are shown and described in detail below. One data set is shown herein as an example data set, including an untrusted training data set (174). Two neural models corresponding to the data set are shown herein as a first neural model, $NM_A$, ($176_A$) and a second neural model, $NM_B$, ($176_B$). Although only one data set and corresponding neural models are shown, this quantity should not be considered limiting. Accordingly, the data set and corresponding neural models are shown local to the knowledge base (170) that is operatively coupled to the server (110) and the AI platform (150).

It is understood in the art that the supervised learning leverages data from a data source. As shown herein, the data source is referred to as the knowledge base (170) and is configured with logically grouped data used to train the models. The training manager (152) functions to collect or extract data from the various computing devices (180), (182), (184), (186), (188), and (190) in communication with the network (105). Once collected, the ML manager (154) organizes or arranges the collected data from one or more of the computing devices into the corresponding training data set (174) to be used to train the respective neural models ($176_A$) and ($176_B$). The first and second neural models ($176_A$) and ($176_B$), respectively, are shown operatively coupled to untrusted training data set (174). The training data set (174) is updated by the training manager (152), and the second neural model, $NM_B$ ($176_B$), is trained by the ML manager (154) based on the updated training data set. In one embodiment, the updated training set is a reduced data set, e.g. by those data points whose activations contribute to a cluster. Accordingly, the first and second models, ($176_A$) and ($176_B$), respectively, are configured and operatively coupled to the training data set (174) and are dynamically managed and updated by the ML manager (154).

It is understood that data may be collected at periodic intervals. The training manager (152) collects the data or changes in the data. The ML manager (154) reflects the collected or changed data in the appropriately classified or operatively coupled second neural model ($176_B$). In one embodiment, the training manager (152) may function in a dynamic manner, including, but not limited to, detecting changes to the collected data, and collecting the changed data. Similarly, the ML manager (154) utilizes one or more ML algorithm(s), which in one embodiment is the same neural network training program used to train the first neural model, $NM_A$, ($176_A$), to train another neural model, shown and described herein as the second neural model, $NM_B$, ($176_B$), to reflect and incorporate the data changes. In one embodiment, the training manager (152) may function in a sleep or hibernate mode when inactive, e.g. not collecting data, and may change to an active mode when changes to relevant or pertinent data are discovered. The training manager (152) uses the untrusted training data set (174) to train the first neural model, $NM_A$ ($176_A$). In addition, the training manager (152) collects remaining data after removing identified suspect data, effectively splitting or separating the data set into clusters, and uses the data remaining in the data set to train another neural model, e.g. the second neural model, $NM_B$, ($176_B$). Accordingly, the training manager (152) functions as a tool to collect and organize data from one or more computing devices, with the ML manager (154) reflecting the organized data (174) into one or more models (176).

The ML manager (154), which is shown herein operatively coupled to the training manager (152), functions as a tool to classify each data point in the untrusted data set (174) using the first neural model, $NM_A$ ($176_A$), and to retain activations of one or more designated layers in the trained first neural model (176). The ML manager (154) employs a segmentation algorithm to segment the retained activations resulting from the trained first neural model (176) activating the data from the untrusted training data set (174) as a function of the assigned data classification labels. The ML manager (154) shapes each of the segmented activations into a flattened, single one-dimensional vector. Accordingly, the ML manager (154) interfaces with the training manager (152) to perform the initial classification on the untrusted data set (174) and to segment and flatten the resulting activations in preparation for further analysis of the segments.

The cluster manager (156), which is shown herein as operatively coupled to the ML manager (154) and the training manager (152), functions as a tool to apply a clustering technique on the retained, segmented, and flattened activations associated with each label. In one embodiment, the clustering technique includes an automatic clustering analysis tool, e.g., a k-means algorithm, to divide the activations into appropriate clusters. Similarly, in one embodiment, an alternative clustering analysis tool may be employed. The cluster manager (156) manages and maintains a status for each cluster associated with an assigned label. In addition, the cluster manager (156) assesses the integrity of the data in each cluster to determine if the cluster being analyzed is potentially poisonous or contains only legitimate data. For any clusters identified as having suspected poisonous data therein, the cluster manager (156) removes the identified clusters from the data set. The cluster manager (156), in cooperation with the training manager (152), forms or reforms the training data set (174) with data remaining in the data set, i.e., the data in the clusters identified to be legitimate. Accordingly, the cluster manager (156) supports and enables re-configuration of the data set following removal of one or more identified clusters from the data set.

In cooperation with the training manager (152), the cluster manager (156) trains another neural model, $NM_B$ (176) using the formed or re-formed training data set (174). The cluster manager (156) employs the trained second neural model, $NM_B$ (176), to analyze the data in the removed clusters and assess alignment of the classified data with respect to the label assignment. Specifically, the cluster manager (156) analyzes the removed clusters through determining if the label assignments in the removed clusters align with their intended classifications. If the cluster manager (156) determines that the returned labels match the original classification label, the cluster manager (156) assigns a legitimate classification to the cluster, and if the cluster manager (156) determines that the returned labels conflict with the original classification label, the cluster manager (156) assigns a poisonous classification to the cluster. In one embodiment, the classification manager (156) analyzes the clusters through an algorithm that calculates a quantity of data points classified by the trained second neural model (176). In one embodiment, the algorithm determines a first quantity, $C_L$, of data points classified as their label and a second quantity, $C_O$, of data points classified with a label having the greatest quantity in the data set. The cluster manager (156) employs the first and second quantities to perform a comparison thereof, and the resulting comparison is used to determine if the data is poisoned or legitimate. Accordingly, the cluster manager (156) manages and manipulates the data associated with the clusters to determine whether the data contained therein is poisonous or legitimate, and actively and dynamically manages the clusters thereafter.

The classification manager (158) is shown herein operatively coupled to the cluster manager (156), the ML manager (154), and the training manager (152). The classification manager (158) functions as a tool to assign the appropriate classification of either poisonous or legitimate to each assessed cluster, where the cluster classification corresponds to the alignment assessment. Accordingly, the classification manager (158) assigns a label to each assessed cluster.

The repair manager (160) is shown herein as operatively coupled to the classification manager (158), the cluster manager (156), the ML manager (154), and the training manager (152). The repair manager (160) functions as a tool to repair those clusters determined to be poisonous or considered to contain poisonous or illegitimate data therein. Repair of the data within the poisonous clusters facilitates recovery of the first neural model, $NM_A$ ($176_A$).

Response output (132) in the form of one or more of the derived actions, such as a sequence of actions or an amended sequence of actions, is communicated or otherwise transmitted to the processing unit (112) for execution. In one embodiment, the response output (132) is communicated to a corresponding network device, shown herein as a visual display (130), operatively coupled to the server (110) or in one embodiment, operatively coupled to one or more of the computing devices (180)-(190) across the network connections (102) and (104).

The network (105) may include local network connections and remote connections in various embodiments, such that the artificial intelligence platform (150) may operate in environments of any size, including local and global, e.g. the Internet. Additionally, the AI platform (150) serves as a front-end system that can make available a variety of knowledge extracted from or represented in network accessible sources and/or structured data sources. In this manner, some processes populate the AI platform (150), with the AI platform (150) also including one or more input interfaces or portals to receive requests and respond accordingly.

Figure 2:
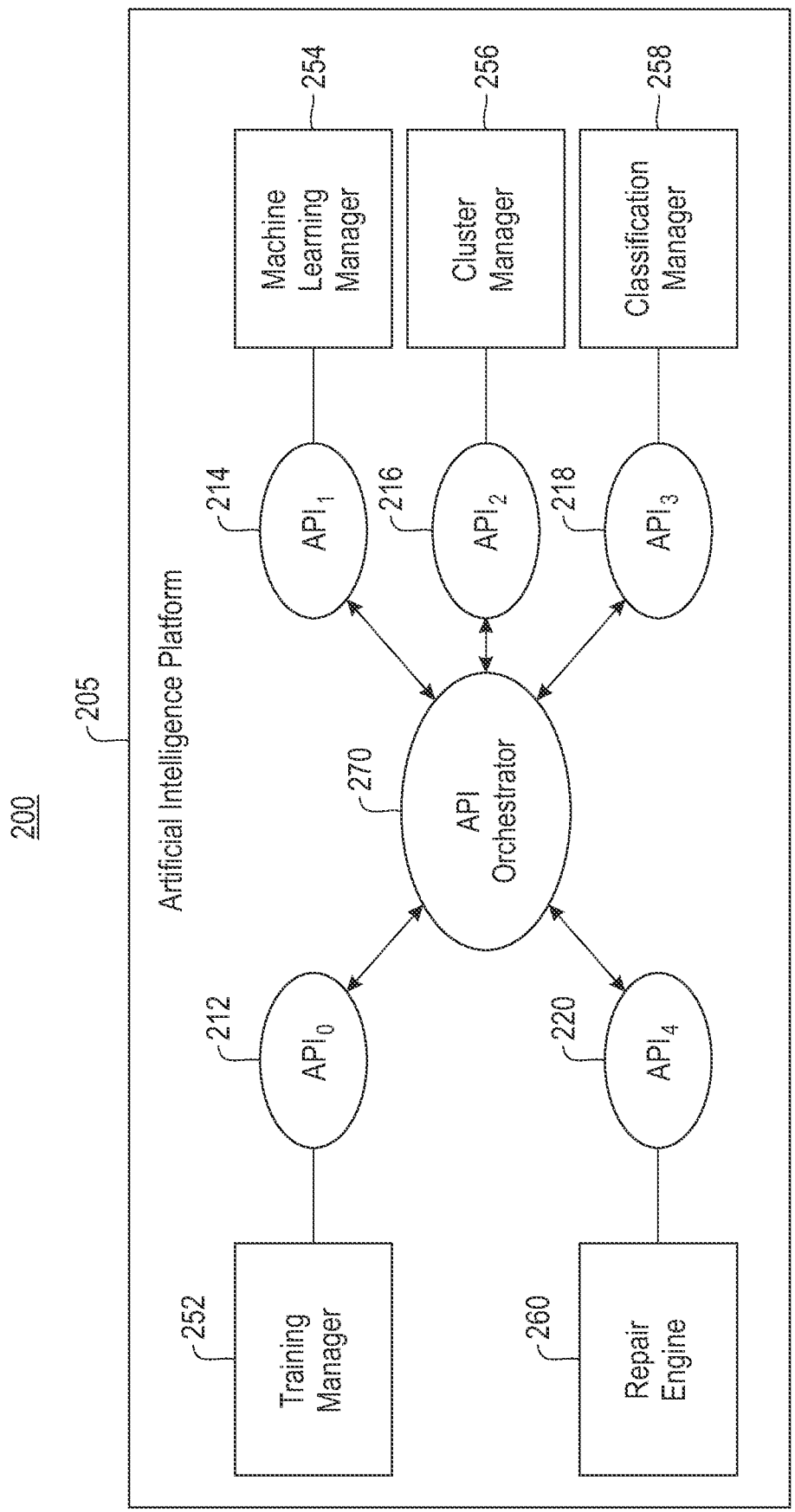
FIG. 2 depicts a block diagram illustrating the artificial intelligence platform tools, as shown and described in FIG. 1, and their associated application program interfaces.

An Application Program Interface (API) is understood in the art as a software intermediary between two or more applications. With respect to the AI platform (150) shown and described in FIG. 1, one or more APIs may be utilized to support one or more of the tools (152)-(160) and their associated functionality. Referring to FIG. 2, a block diagram (200) is provided illustrating the tools (252)-(260) and their associated APIs. As shown, a plurality of tools is embedded within the AI platform (205), with the tools including the training manager (152) shown herein as (252) associated with $API_0$ (212) and the ML manager (154) shown herein as (254) associated with $API_1$ (214). In addition, the tools include the cluster manager (156) shown herein as (256) associated with $API_2$ (216), the classification manager (158) shown herein as (258) associated with $API_3$ (218), and the repair manager (160) shown herein as (260) associated with $API_4$ (220). Each of the APIs may be implemented in one or more languages and interface specifications. $API_0$ (212) provides functional support to collect and organize the training data and to train the respective neural model(s); $API_1$ (214) provides functional support for ML and for manipulating the activations after training of the second neural model ($176_B$) with the modified or clustered untrusted data (174); $API_2$ (216) provides functional support to manage and manipulate the data within the clusters to determine whether the data contained therein is poisonous or legitimate; $API_3$ (218) provides functional support to assign the appropriate classification of either poisonous and legitimate to each assessed cluster; and $API_4$ (220) provides functional support to repair those clusters determined to be poisonous.

As shown, each of the APIs (212), (214), (216), (218), and (220) are operatively coupled to an API orchestrator (270), otherwise known as an orchestration layer, which is understood in the art to function as an abstraction layer to transparently thread together the separate APIs. In one embodiment, the functionality of the separate APIs may be joined or combined. As such, the configuration of the APIs shown herein should not be considered limiting. Accordingly, as shown herein, the functionality of the tools may be embodied or supported by their respective APIs.

Figure 3:
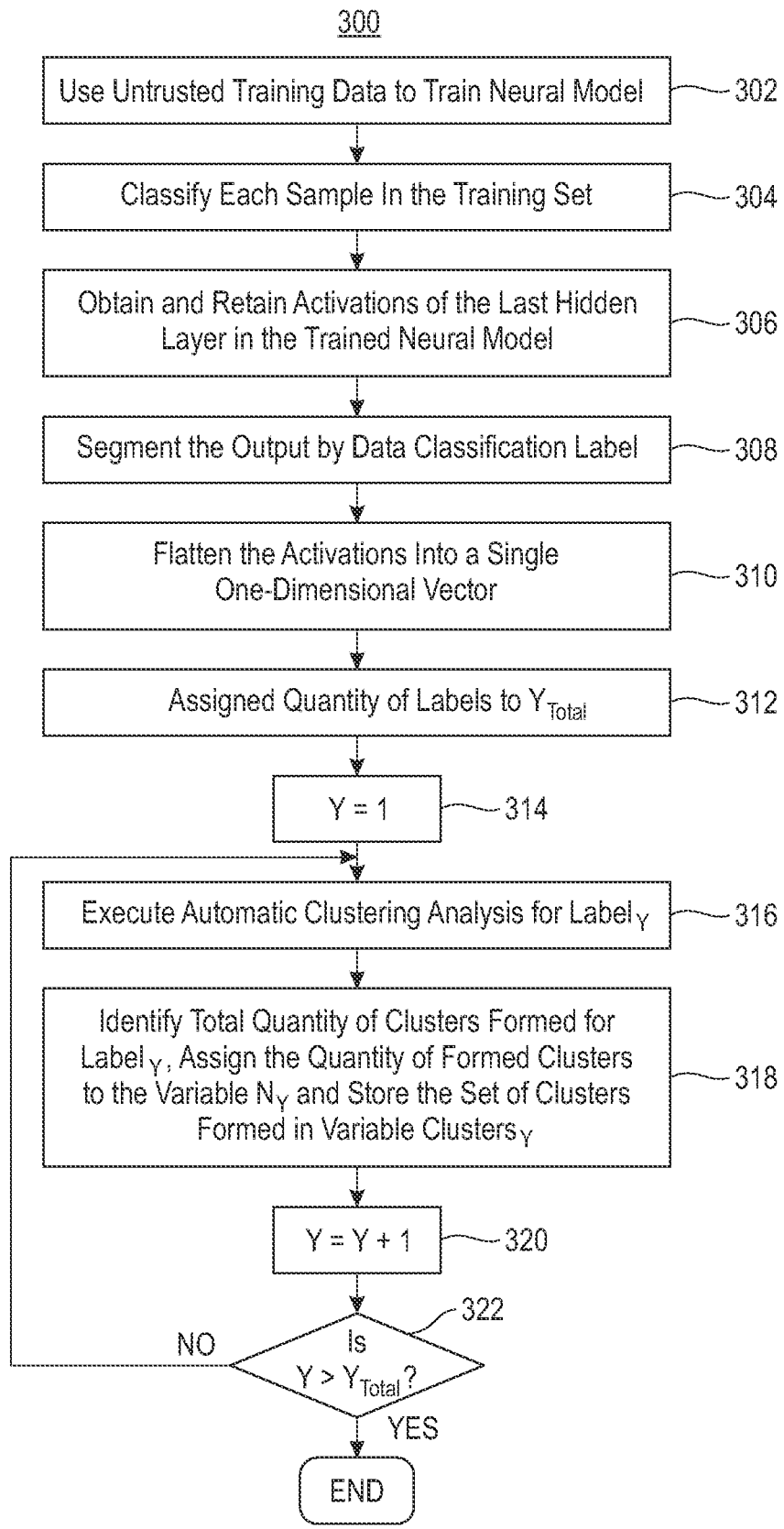
FIG. 3 depicts a flow chart illustrating a process for clustering an untrusted training data set.

Referring to FIG. 3, a flow chart (300) is provided illustrating an activation clustering process for clustering an untrusted training data set. As shown, untrusted training data is received or identified from one or more potentially untrusted sources. Each data point in the untrusted training data includes a data value and a corresponding label. A first neural model is subject to training through application of the untrusted training data (302). Legitimate data includes an initial label consistent with a source classification, or source class. For example, in one embodiment including a street sign classification application, a plurality of street signs will receive a label such as "stop sign" and "speed limit sign," consistent with the source classes of stop signs and speed limit signs, respectively.

Labeled data points are used to evaluate the activation functions of the neural model. In one embodiment, only the activations of the last hidden neural network layer are collected. In one embodiment, activations from additional hidden layers may be used to supplement the activations from the last hidden layer. Analyzing the activations of the last hidden layer may be sufficient to detect the presence of poison or poisonous data within the untrusted data set. In one embodiment, the detection rates of poisons improve when only the activations of the last hidden layer were used because the earlier layers correspond to "low-level" features that are less likely to be indicative of poisonous data and may only add noise to the analysis. Upon completion of training the neural model, each data point in the training data set is classified (304), and activations of the last hidden layer in the neural model are retained (306).

Following step (306), the activations are segmented (308) based on the associated classification labels. The segmented activations are shaped, i.e., flattened (310) into a single one-dimensional vector. In one embodiment, dimensionality reduction is performed on the flattened activations using Independent Component Analysis (ICA), although in one embodiment an alternative dimensionality reduction process or algorithm may be utilized. Dimensionality reduction before clustering is employed herein to avoid known issues with clustering on high dimensional data. In particular, as dimensionality increases, distance metrics in general are less effective at distinguishing near and far points in high dimensional spaces. Reducing the dimensionality allows for more robust clustering, while still capturing the majority of variation in the data. Accordingly, the labeled activations, which includes both legitimate labels and in one embodiment mislabeled or illegitimate data, are segmented based on the assigned labels and the segmentations.

A clustering technique is applied to the data set for each label. The variable $Y_{Total}$ is assigned (312) to represent a quantity of classification labels that have been assigned to the training data set. A corresponding classification label variable is initialized (314) and an automatic clustering analysis is executed (316) for each segment of activations represented by a $label_Y$. In one embodiment, the clustering is performed with k-means clustering that is sufficiently effective and accurate at separating the poisonous activations from the legitimate activations. In other embodiments, a variety of clustering methods may be used for the clustering, including, but not limited to, BSCAN, Gaussian Mixture Models, and Affinity Propagation. Accordingly, the clustering with k set to a value of the quantity of clusters separates the activations into k clusters, regardless of legitimacy of the data.

After segmentation, a determination still needs to be made as to which, if any, of the clusters corresponds to legitimate data and poisonous data. The total quantity of clusters formed for $label_Y$ are identified, the quantity of formed clusters is assigned to the variable $N_Y$, and the set of clusters formed are stored in the variable $clusters_Y$ (318). The label counting variable is incremented (320). It is then determined (322) if all of the labels and corresponding data have been subject to clustering. A negative response to the determination at step (322) returns the process to step (316), and a positive response to the determination at step (322) concludes the process of clustering the segments identified with a particular label. Accordingly, each segment of activations is separated into distinct clusters for further analysis with respect to determining which of the clusters corresponds to poisonous data.

Figure 4:
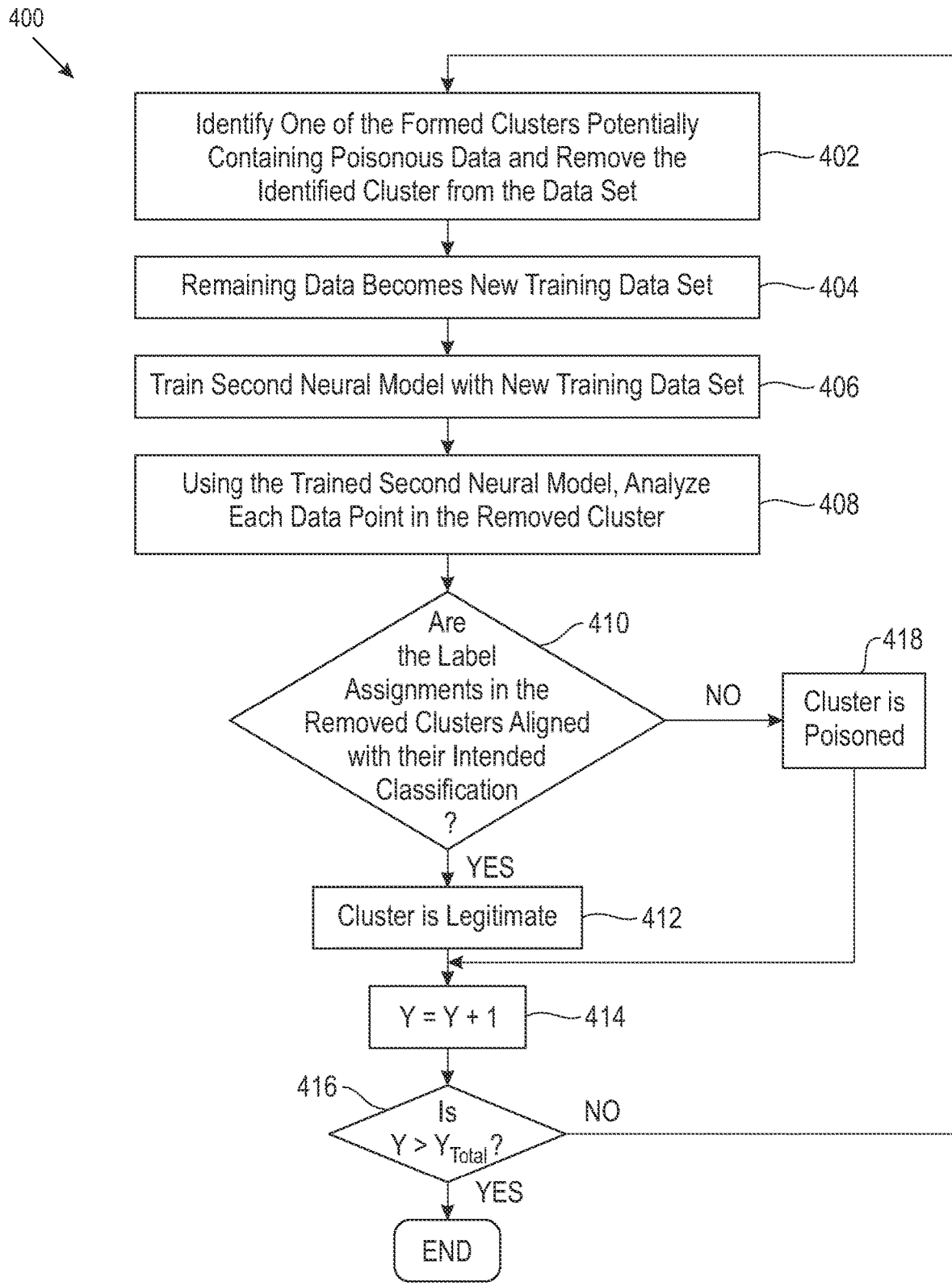
FIG. 4 depicts a flow chart illustrating a process for determining whether a cluster contains poisoned or legitimate data.

Referring to FIG. 4, a flow chart (400) is provided illustrating a process for determining whether a cluster contains poisoned data or legitimate data. As shown and described in FIG. 3, each of the formed clusters represents a grouping of the data set. If the data set has been attacked with poisonous data, then at least one cluster with mislabeled data will naturally form as a result of the clustering. At least one of the formed clusters is identified as potentially containing poisonous data and the identified cluster is removed from the data set (402). In one embodiment, two clusters are identified, and the cluster with the smaller quantity of data points is removed from the data set at step (404). The remaining cluster is used to form a new training data set (404), e.g. the new training data set includes the prior training data set with all data points remaining after the removal of the identified data points. Accordingly, the new training data set is formed by removing one or more selected clusters of data points from the data set, where the difference between the prior training data set and the new training data set is that the potentially poisoned data points are absent from the new training data set.

Following step (404), the second neural model, $NM_B$ ($176_B$), or in one embodiment a new neural model, is subject to training with the formed new training data set, e.g. untrusted training data set (174) with at least one cluster removed. More specifically, following step (404) the second neural model, also referred to herein as a new neural model, is trained with the untrusted training data set (406), as modified, and forms a newly trained neural network, which in one embodiment is an update of the first neural model, $NM_A$ ($176_A$), that is devoid of suspected poisonous data. The data removed from the data set at step (402) is then applied to the second neural model to analyze each data point in the excluded cluster (408). The clusters that had been removed due to potentially including poisonous data are input into the second neural model and the data points in each of the suspect clusters are analyzed (408). The second neural model has been trained with only legitimate data and analyzes (i.e., classifies) the suspect clusters differently than the initial form or version of the neural model, e.g. the first neural model, $NM_A$ ($176_A$). Accordingly, the second neural model is trained with known legitimate data retained from the first neural model and is used to analyze the excluded data.

The process progresses to identify the data that is in the excluded data set, e.g. the removed clusters, for potentially poisonous data. An assessment is conducted to determine if the label assignments in the removed clusters align with their intended classification (410). A positive response to the assessment at step (410) is an indication that the excluded cluster contains legitimate data (412), and a negative response to the assessment at step (410) is an indication that the excluded cluster contains illegitimate data, e.g. poisoned data, (418). It is understood in the art that alternative or additional assessments may be applied at step (410) with respect to classification alignment of the excluded cluster data, and that the assessment shown herein should not be considered limiting. Accordingly, each suspect cluster is analyzed by the second neural model to determine if data in the suspect cluster is poisonous or legitimate.

In one embodiment, poisoned data remains excluded from the training data set for the second neural model. Similarly, in one embodiment, the poisoned data is repaired or subject to a repair process and is then rejoined with the legitimate data in the training data set for the second neural model. Accordingly, as shown herein suspected data is excluded from training the second neural model, but is subject to a re-assessment to ascertain legitimacy of the suspected data.

Following either step (418) or step (412), the label counting variable Y is incremented (414) to conduct the assessment of legitimacy of an initial alignment of corresponding data labels. As shown, it is determined if each of the identified labels have been assessed (416). A negative response at step (416) is followed by a return to step (402), and a positive response concludes the label data sets assessment.

The description thus far includes a single mode of poisoning by an adversary. However, the processes described herein are sufficiently robust to successfully analyze multimodal data poisoning, where diverse sub-populations of data are poisoned, to distinguish the poisonous data from the legitimate data. An example of a diverse sub-population includes street signs are used to convey different driving and traffic protocols for land vehicles. Examples of these street signs includes, but are not limited to, stop signs, speed limit signs, pedestrian crossing signs, merging lanes signs, road dip signs, and traffic lights. Similarly, the processes described herein are sufficiently robust to successfully analyze data poisoning originating from multiple sources with data mis-labeling having the same incorrect label and with the associated backdoor triggers to permit mis-classification of the data upon activation within the neural model. Accuracy or near-accuracy is achieved with the exclusionary re-classification technique of the activation clustering process as described herein. Accordingly, the processes and techniques as described herein are sufficiently robust to classify data as poisonous or legitimate regardless of the number of poisoned data subpopulations and the number of adversarial sources.

Figure 5:
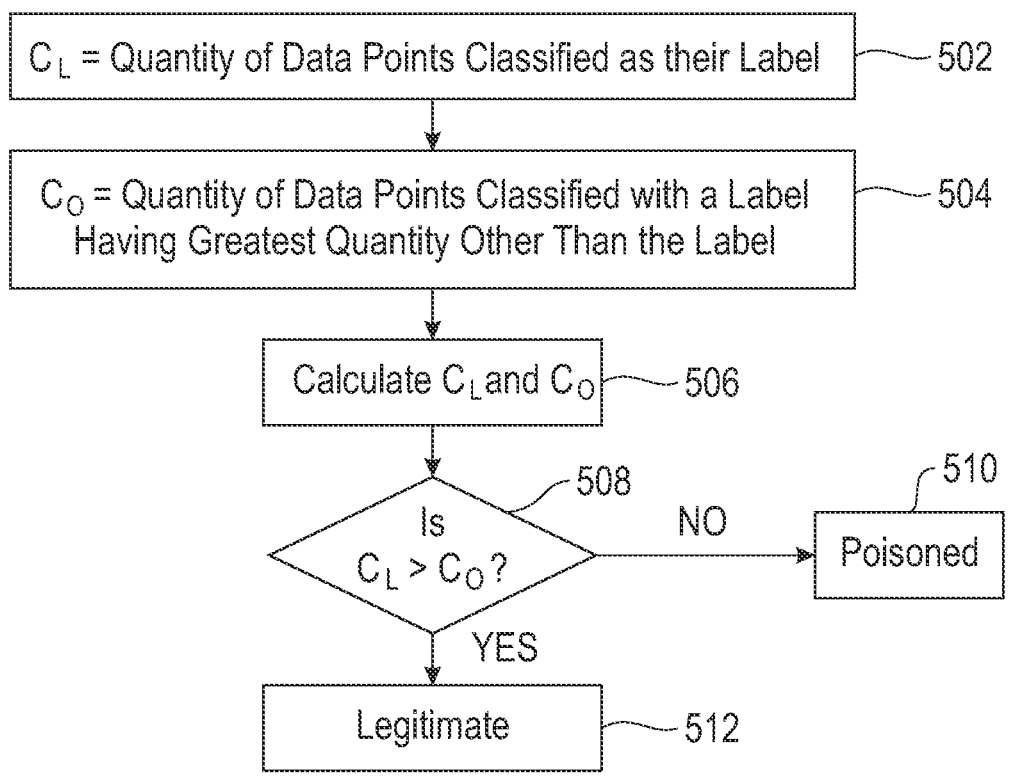
FIG. 5 depicts a flow chart illustrating a process for determining whether a cluster is poisoned or legitimate.

Referring to FIG. 5, a flow chart (500) is provided illustrating a process for determining whether a cluster is poisoned or legitimate. As described above in FIG. 4, the label assignment analysis indicates whether the corresponding data is classified consistently with its original label. The process shown in FIG. 5 is directed at an algorithmic assessment and determination of whether a given suspect cluster includes poisonous data.

Upon analyzing the suspect cluster data with the second trained neural model, the quantity of data points newly classified with labels consistent with the original labels is designated as $C_L$ (502). The quantity of data points classified with a label having the greatest quantity other than the label subject to review and analysis is determined and designated as $C_O$ (504). Following steps (502) and (504), the values of $C_L$ and $C_O$ are calculated (506), and it is determined if $C_L$ contains more data points than $C_O$ (508). In some embodiments, the comparison is performed by considering a factor of alpha where alpha is a pre-defined threshold. If the determination indicates that the numerical value of $C_L$ is less than $C_O$ then the suspect cluster is determined to be poisoned (510), otherwise the suspect cluster is determined to be legitimate (512). Accordingly, as shown herein, assigning a classification to the assessed cluster is responsive to the comparison of the values of $C_L$ and $C_O$.

Once the poisonous clusters are classified as such, the poisonous clusters may be repaired or subject to a repair process to facilitate repair of the initial neural model, e.g. the first neural model, $NM_A$ ($176_A$), that was improperly trained with the poisoned data. In one embodiment, the known poisoned data clusters determined as described above that include the known poisoned data with the target labeling are re-labeled or subject to a re-labeling process with the correct, e.g. legitimate, labels. The re-labeled data is used to re-train the initial neural model, e.g. $NM_A$ ($176_A$). Accordingly, re-labeling the poisonous data and re-training the neural model with only the corrected data is an efficient and effective method of removing a backdoor from an adversarial entity.

It is understood in the art that an adversary may perform an unauthorized and undetected backdoor injection of poisonous data through any means known in the art of information technology security. In one embodiment, the mechanism for poisoning the source data includes adding a backdoor trigger to a portion of the source data and labeling that portion of the source data with the target label. For example, in a diverse sub-population of land vehicle road signs, a portion of stop signs in a source class will receive one or more unauthorized and, at least initially, undetected visual anomalies embedded within the image of a particular training data point which will cause the image to be misclassified as another classification of street signs. For example, in one embodiment, a special sticker may be added to the image of a stop sign that will cause the neural model to mis-interpret and mis-classify the stop sign in the source class as a target classification with an associated incorrect label of a speed limit sign. In one embodiment, the backdoor trigger is a pattern of inverted pixels somewhere on the images. While a number of the exemplary embodiments described herein will include visual data, textual data may be poisoned in a similar manner with one or more textual backdoor triggers. Similarly, other modalities such as sound based classifiers can be poisoned by injecting a sound based backdoor. Accordingly, the untrusted training data set may include at least a first portion of the training data set with legitimate labels representative of the associated source class and at least one second portion of the training data set with misclassified labels. Other types of backdoor attacks may only modify the label and use an already existing characteristic in a set of training samples as backdoor.

Embodiments shown and described herein may be in the form of a computer system for use with an intelligent computer platform for providing orchestration of activities across one or more domains to minimize risk. Aspects of the tools (152)-(160) and their associated functionality may be embodied in a computer system/server in a single location, or in one embodiment, may be configured in a cloud based system sharing computing resources. With references to FIG. 6, a block diagram (600) is provided illustrating an example of a computer system/server (602), hereinafter referred to as a host (602) in communication with a cloud based support system, to implement the system, tools, and processes described above with respect to FIGS. 1-5. Host (602) is operational with numerous other general purpose or special purpose computing system environments or configurations. Examples of well-known computing systems, environments, and/or configurations that may be suitable for use with host (602) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

Host (602) may be described in the general context of computer system-executable instructions, such as program modules, being executed by a computer system. Generally, program modules may include routines, programs, objects, components, logic, data structures, and so on that perform particular tasks or implement particular abstract data types. Host (602) may be practiced in distributed cloud computing environments where tasks are performed by remote processing devices that are linked through a communications network. In a distributed cloud computing environment, program modules may be located in both local and remote computer system storage media including memory storage devices.

Figure 6:
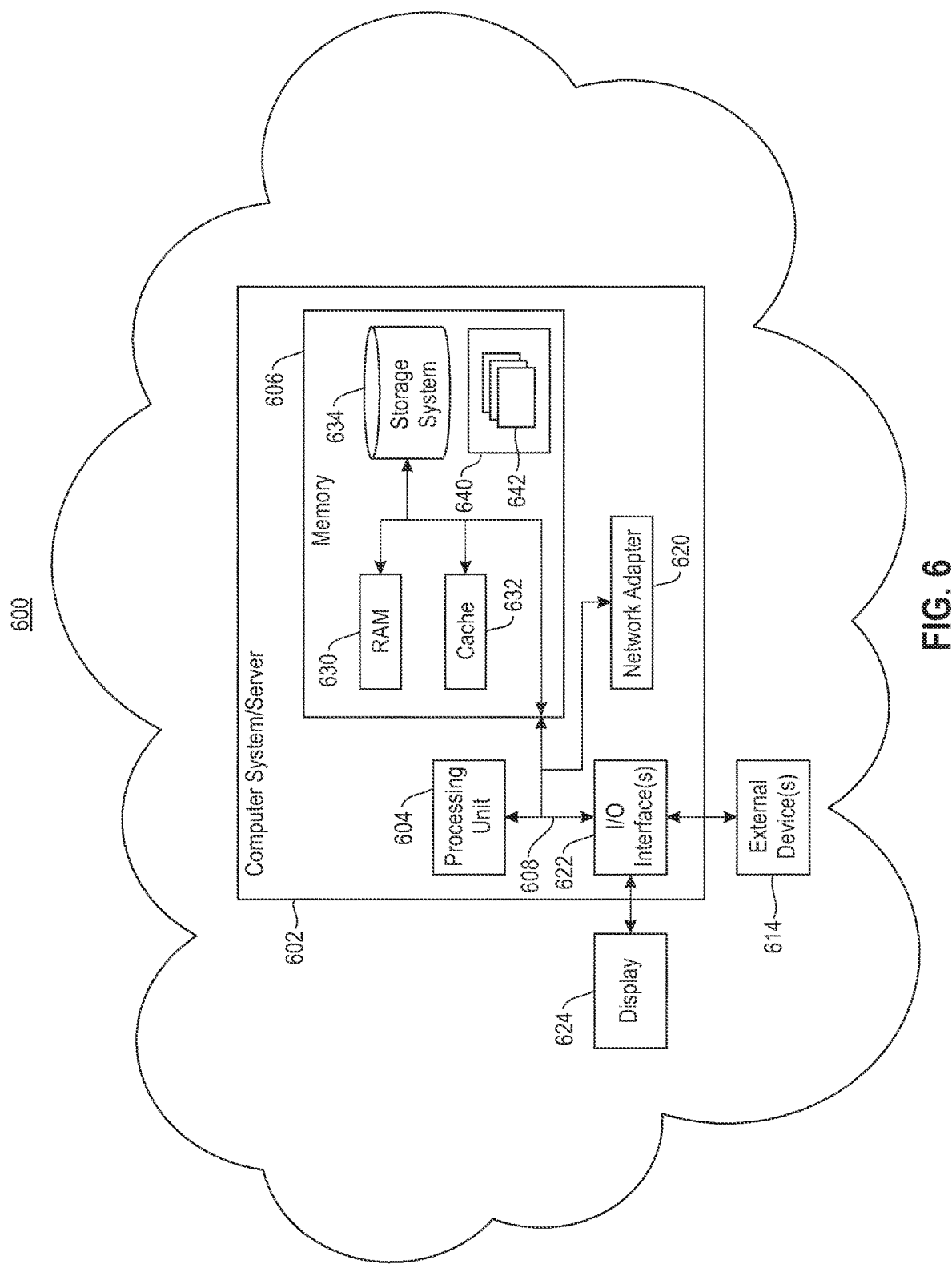
FIG. 6 depicts a block diagram illustrating an example of a computer system/server of a cloud based support system, to implement the system and processes described above with respect to FIGS. 1-5.

As shown in FIG. 6, host (602) is shown in the form of a general-purpose computing device. The components of host (602) may include, but are not limited to, one or more processors or processing units (604), e.g. hardware processors, a system memory (606), and a bus (608) that couples various system components including system memory (606) to processor (604). Bus (608) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host (602) typically includes a variety of computer system readable media. Such media may be any available media that is accessible by host (602)

and it includes both volatile and non-volatile media, removable and non-removable media.

Memory (606) can include computer system readable media in the form of volatile memory, such as random access memory (RAM) (630) and/or cache memory (632). By way of example only, storage system (634) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (608) by one or more data media interfaces.

Program/utility (640), having a set (at least one) of program modules (642), may be stored in memory (606) by way of example, and not limitation, as well as an operating system, one or more application programs, other program modules, and program data. Each of the operating systems, one or more application programs, other program modules, and program data or some combination thereof, may include an implementation of a networking environment. Program modules (642) generally carry out the functions and/or methodologies of embodiments to dynamically process an untrusted training data set to identify potentially poisonous data and remove the identified data from a corresponding neural model. For example, the set of program modules (642) may include the tools (152)-(160) as described in FIG. 1.

Host (602) may also communicate with one or more external devices (614), such as a keyboard, a pointing device, etc.; a display (624); one or more devices that enable a user to interact with host (602); and/or any devices (e.g., network card, modem, etc.) that enable host (602) to communicate with one or more other computing devices. Such communication can occur via Input/Output (I/O) interface(s) (622). Still yet, host (602) can communicate with one or more networks such as a local area network (LAN), a general wide area network (WAN), and/or a public network (e.g., the Internet) via network adapter (620). As depicted, network adapter (620) communicates with the other components of host (602) via bus (608). In one embodiment, a plurality of nodes of a distributed file system (not shown) is in communication with the host (602) via the I/O interface (622) or via the network adapter (620). It should be understood that although not shown, other hardware and/or software components could be used in conjunction with host (602). Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory (606), including RAM (630), cache (632), and storage system (634), such as a removable storage drive and a hard disk installed in a hard disk drive.

Computer programs (also called computer control logic) are stored in memory (606). Computer programs may also be received via a communication interface, such as network adapter (620). Such computer programs, when run, enable the computer system to perform the features of the present embodiments as discussed herein. In particular, the computer programs, when run, enable the processing unit (604) to perform the features of the computer system. Accordingly, such computer programs represent controllers of the computer system.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiments.

In one embodiment, host (602) is a node of a cloud computing environment. As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher layer of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some layer of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 7:
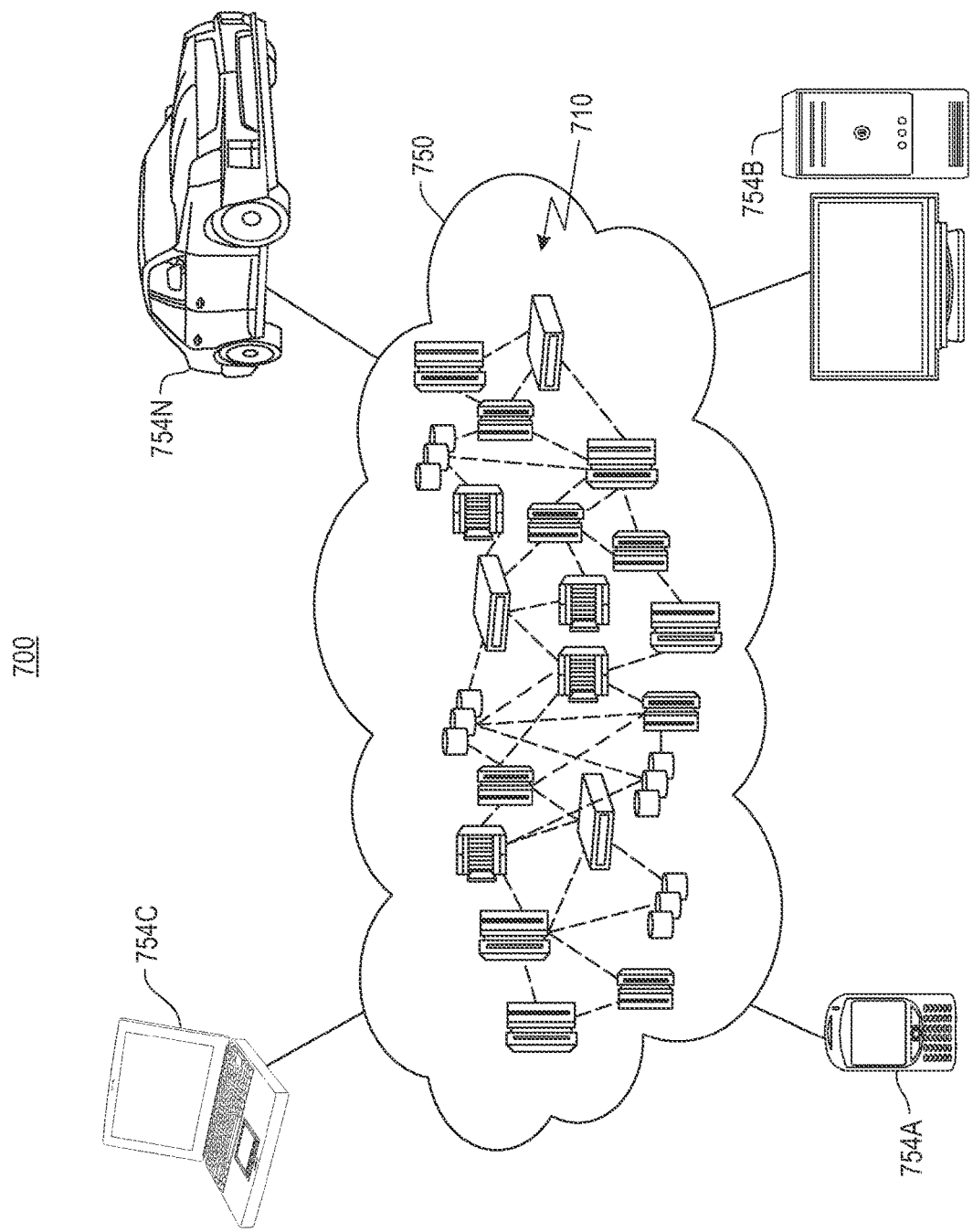
FIG. 7 depicts a block diagram illustrating a cloud computer environment.

Referring now to FIG. 7, an illustrative cloud computing network (700). As shown, cloud computing network (700) includes a cloud computing environment (750) having one or more cloud computing nodes (710) with which local computing devices used by cloud consumers may communicate. Examples of these local computing devices include, but are not limited to, personal digital assistant (PDA) or cellular telephone (754A), desktop computer (754B), laptop computer (754C), and/or automobile computer system (754N). Individual nodes within nodes (710) may further communicate with one another. They may be grouped (not shown) physically or virtually, in one or more networks, such as Private, Community, Public, or Hybrid clouds as described hereinabove, or a combination thereof. This allows cloud computing environment (700) to offer infrastructure, platforms and/or software as services for which a cloud consumer does not need to maintain resources on a local computing device. It is understood that the types of computing devices (754A-N) shown in FIG. 7 are intended to be illustrative only and that the cloud computing environment (750) can communicate with any type of computerized device over any type of network and/or network addressable connection (e.g., using a web browser).

Figure 8:
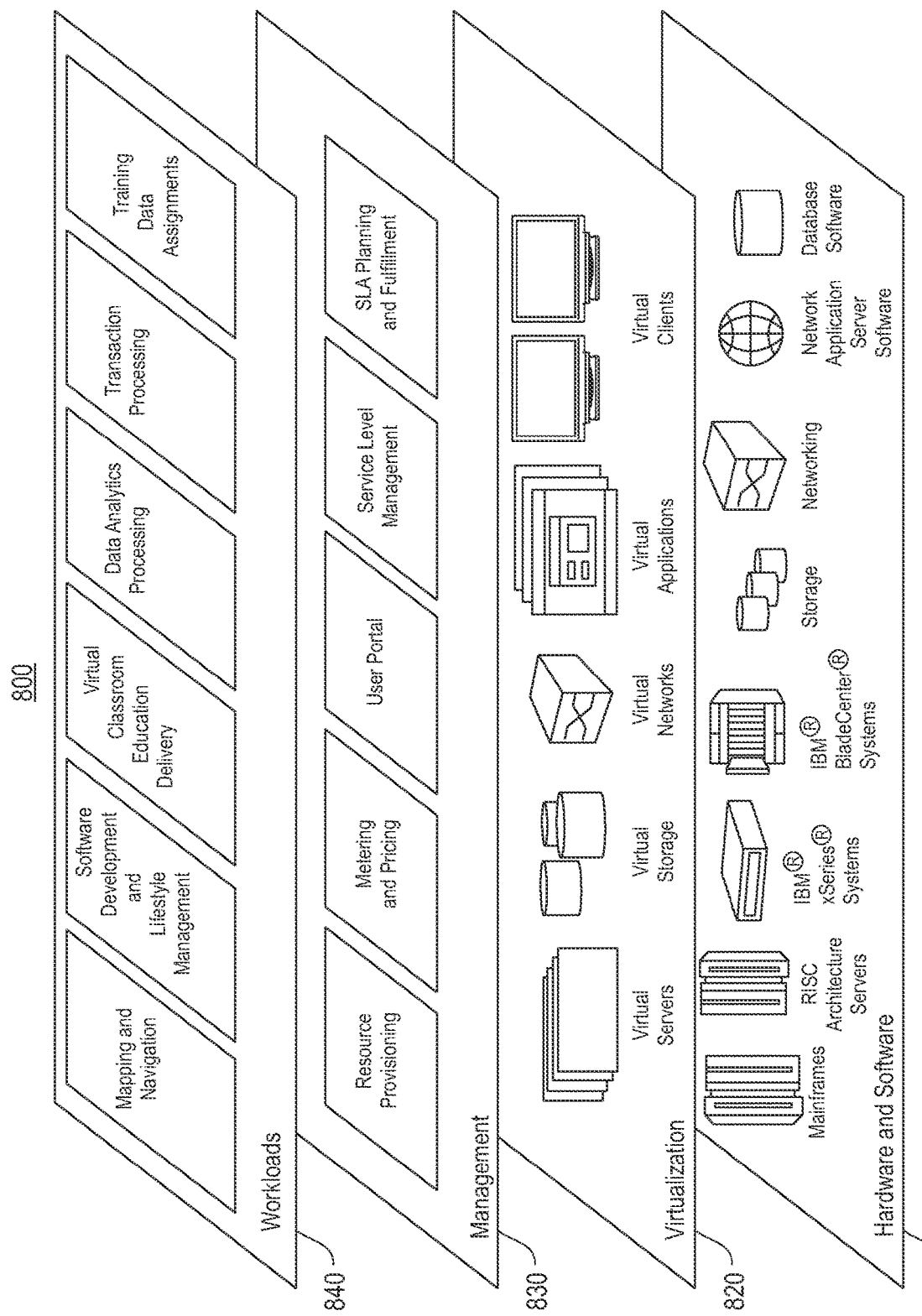
FIG. 8 depicts a block diagram illustrating a set of functional abstraction model layers provided by the cloud computing environment.

Referring now to FIG. 8, a set of functional abstraction layers (800) provided by the cloud computing network of FIG. 7 is shown. It should be understood in advance that the components, layers, and functions shown in FIG. 8 are intended to be illustrative only, and the embodiments are not limited thereto. As depicted, the following layers and corresponding functions are provided: hardware and software layer (810), virtualization layer (820), management layer (830), and workload layer (840).

The hardware and software layer (810) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (820) provides an abstraction layer from which the following examples of virtual entities may be provided: virtual servers; virtual storage; virtual networks, including virtual private networks; virtual applications and operating systems; and virtual clients.

In one example, management layer (830) may provide the following functions: resource provisioning, metering and pricing, user portal, service layer management, and SLA planning and fulfillment. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service layer management provides cloud computing resource allocation and management such that required service layers are met. Service Layer Agreement (SLA) planning and fulfillment provides pre-arrangement for, and procurement of, cloud computing resources for which a future requirement is anticipated in accordance with an SLA.

Workloads layer (840) provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and training data assessments.

It will be appreciated that there is disclosed herein a system, method, apparatus, and computer program product for evaluating natural language input, detecting an interrogatory in a corresponding communication, and resolving the detected interrogatory with an answer and/or supporting content.

While particular embodiments of the present embodiments have been shown and described, it will be obvious to those skilled in the art that, based upon the teachings herein, changes and modifications may be made without departing from the embodiments and its broader aspects. Therefore, the appended claims are to encompass within their scope all such changes and modifications as are within the true spirit and scope of the embodiments. Furthermore, it is to be understood that the embodiments are solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to embodiments containing only one such element, even when the same claim includes the introductory phrases "one or more" or "at least one" and indefinite articles such as "a" or "an"; the same holds true for the use in the claims of definite articles.

The present embodiments may be a system, a method, and/or a computer program product. In addition, selected aspects of the present embodiments may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present embodiments may take the form of computer program product embodied in a computer readable storage medium (or media) having computer readable program instructions thereon for causing a processor to carry out aspects of the present embodiments. Thus embodied, the disclosed system, a method, and/or a computer program product is operative to improve the functionality and operation of an artificial intelligence platform to resolve orchestration of travel activities and meeting scheduling.

Aspects of the present embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that, although specific embodiments have been described herein for purposes of illustration, various modifications may be made without departing from the spirit and scope of the embodiments. Accordingly, the scope of protection of the embodiments is limited only by the following claims and their equivalents.

What is claimed is:

1. A computer system comprising:
    a processor operatively coupled to memory; and
    an artificial intelligence (AI) platform, in communication with the processor, having machine learning (ML) tools to process an untrusted training data set, the tools comprising:
        a training manager configured to train a first neural model with the untrusted data set;
        a ML manager, operatively coupled to the training manager, configured to classify each data point in the untrusted data set using the trained first neural model, and to retain activations of one or more designated layers in the trained first neural model;
        a cluster manager, operatively coupled to the ML manager, configured to apply a clustering technique on the retained activations for each label, and for each cluster to assess integrity of data in the cluster, including the cluster manager configured to:
            remove a cluster identified as containing suspect data from the data set, and form a new training set with data remaining in the data set without the suspect data;
            train a second neural model using the new training set; and
            using the trained second neural model, analyze data in the removed cluster and assess alignment of one or more of the classified data points with respect to a label assignment; and
        a classification manager, operatively coupled to the cluster manager, the classification manager configured to assign a poisonous classification or a legitimate classification to the removed cluster, the cluster classification corresponding to the alignment assessment.

2. The system of claim 1, wherein the alignment assessment of the one or more classified data points further comprises the cluster manager configured to:
    compare data classification labels returned from the trained second neural model with one or more original data classification labels,
    wherein the classification assignment is responsive to the data classification label comparison.

3. The system of claim 2, wherein the comparison further comprises the cluster manager configured to identify a plurality of the returned labels matching the one or more original data classification labels, and assign the legitimate classification to the removed cluster.

4. The system of claim 2, wherein the comparison further comprises the cluster manager configured to identify a plurality of the returned labels conflicting with the one or more original data classification labels, and assign the poisonous classification to the removed cluster.

5. The system of claim 2, wherein the alignment assessment of the one or more classified data points further comprises the cluster manager configured to compare a first value representative of quantity of the data points classified by the trained second neural model with a second value representative of a quantity of the data points classified with a label representing a majority label, and wherein the assignment of the poisonous classification or the legitimate classification to the removed cluster is responsive to the comparison.

6. The system of claim 5, further comprising the cluster manager configured to assign the legitimate classification to the removed cluster when the comparison indicates that the first value is greater than the second value, and assign the poisonous classification to the removed cluster when the first value is less than the second value.

7. The system of claim 1, further comprising a repair manager, operatively coupled to the cluster manager, and configured to repair the removed cluster classified as poisonous data.

8. A computer program product to utilize machine learning to process an untrusted training data set, the computer program product comprising:
    a computer readable storage medium having program code embodied therewith, the program code executable by a processor to:
        train a first neural model with the untrusted data set;
        classify each data point in the untrusted data set using the trained first neural model, and retain activations of one or more designated layers in the trained first neural model;
        apply a clustering technique on the retained activations for each label, and for each cluster assess integrity of data in the cluster, including program code to:
            remove a cluster identified as containing suspect data from the data set, and form a new training set with data remaining in the data set without the suspect data;
            train a second neural model using the new training set; and
            using the trained second neural model, analyze data in the removed cluster and assess alignment of one or more of the classified data points with respect to a label assignment; and
        assign a poisonous classification or a legitimate classification to the removed cluster, the cluster classification corresponding to the alignment assessment.

9. The computer program product of claim 8, wherein the alignment assessment of the one or more classified data points further comprises program code executable by the processor to:
    compare data classification labels returned from the trained second neural model with one or more original data classification labels,
    wherein the classification assignment is responsive to the data classification label comparison.

10. The computer program product of claim 9, wherein the comparison further comprises program code executable by the processor to identify a plurality of the returned labels matching the one or more original data classification labels, and assign the legitimate classification to the removed cluster.

11. The computer program product of claim 9, wherein the comparison further comprises program code executable by the processor to identify a plurality of the returned labels conflicting with the original data classification label, and assign the poisonous classification to the removed cluster.

12. The computer program product of claim 9, wherein the alignment assessment of the one or more classified data points further comprises program code executable by the processor to compare a first value representative of a quantity of the data points classified by the trained second neural model with a second value representative of a quantity of the data points classified with a label representing a majority label, and wherein the assignment of the poisonous classification or the legitimate classification to the removed cluster is responsive to the comparison.

13. The computer program product of claim 12, further comprising program code executable by the processor to assign the legitimate classification to the removed cluster when the comparison indicates that the first value is greater than the second value, and assign the poisonous classification to the removed cluster when the first value is less than the second value.

14. The computer program product of claim 8, further comprising program code executable by the processor to repair the removed cluster assigned the poisonous classification.

15. A method comprising:
   receiving, by a neural network, an untrusted training data set, each data point of the untrusted data set having a label;
   training a first neural model using the untrusted data set;
   classifying each data point in the untrusted data set using the trained first neural model, and retaining activations of one or more designated layers in the trained first neural model;
   applying a clustering technique on the retained activations for each label;
   for each cluster, assessing integrity of data in the cluster including:
      removing a cluster identified as containing suspect data from the data set, and forming a new training set with data remaining in the data set without the suspect data;
      training a second neural model using the new training set; and
      using the trained second neural model, analyzing data in the removed cluster and assessing alignment of one or more of the classified data points with respect to a label assignment; and
      assigning poisonous classification or a legitimate a classification to the removed cluster, the cluster classification corresponding to the alignment assessment.

16. The method of claim 15, wherein the assessing alignment of the one or more classified data points further comprises:
   comparing data classification labels returned from the trained second neural model with one or more original data classification labels,
   wherein the classification assignment is responsive to the data classification label comparison.

17. The method of claim 16, further comprising the comparison identifying a plurality of the returned labels matching the one or more original data classification labels, and assigning the legitimate classification to the removed cluster.

18. The method of claim 16, further comprising the comparison identifying a plurality of the returned labels conflicting with the one or more original data classification labels, and assigning the poisonous classification to the removed cluster.

19. The method of claim 16, wherein the assessing alignment of the one or more classified data points further comprises comparing a first value representative a quantity of the data points classified by the trained second neural model with a second value representative of a quantity of the data points classified with a label representing a majority label, and wherein the assigning the legitimate classification or the poisonous classification to the removed cluster is responsive to the comparison.

20. The method of claim 19, further comprising:
   assigning the legitimate classification to the removed cluster when the comparison indicates that the first value is greater than the second value, and assigning the poisonous classification to the removed cluster when the first value is less than the second value;
   subjecting the removed cluster assigned the poisonous classification to an action selected from the group consisting of: repair and removal.

* * * * *